United States Patent Office 3,453,283
Patented July 1, 1969

3,453,283
NOVEL 6-SUBSTITUTED-1-(PIPERIDYL-ALKYL)-
1,2,3,4-TETRAHYDRONAPHTHALENES
Don M. Lynch, Waukegan, Ill., assignor to Abbott Laboratories, North Chicago, Ill., a corporation of Illinois
No Drawing. Filed Dec. 30, 1965, Ser. No. 517,849
Int. Cl. C07d 29/24, 28/18; A61k 27/00
U.S. Cl. 260—294.7
4 Claims

ABSTRACT OF THE DISCLOSURE

6 - substituted - 1 - (piperidylalkyl) - 1,2,3,4-tetrahydronaphthalenes in which the nitrogen atom may be substituted and acid-addition salts thereof show female sex hormonal activities.

The present invention is directed to new naphthalenes substituted in the 1- and 6-positions which exhibit steroid-like activities.

The compounds of the present invention have the general formula

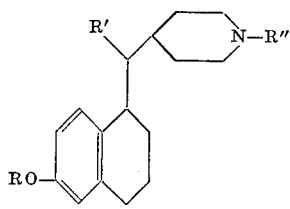

wherein each, R and R', is hydrogen or methyl and wherein R'' is hydrogen, loweralkyl, formyl, lower fatty acid acyl or carboloweralkoxy, and acid addition salts thereof. These compounds have weak female sex hormonal activities and are useful for the inhibition of reproduction in mammals. They may be administered intramuscularly in dosages of from 0.1 to 2.5 mg./kg. as aqueous suspension or as vegetable oil solutions, or at dosages of 0.1 to 4 mg./kg. orally.

The new compounds are prepared by hydrogenating a compound of the formula

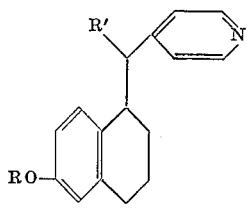

wherein R or R' each is hydrogen or methyl, and wherein the 1-position of the naphthalene ring carries hydrogen or a double bond, or acid addition salts thereof, in an inert, organic solvent in the presence of a rhodium catalyst at a pressure between about 5 and 100 p.s.i.g. and at a temperature between room temperature and 100° C., until the pyridine ring is saturated, and isolating from the reaction mixture the formed 6-substituted-1-(4-piperidyl-1-alkyl-1,2,3,4-tetrahydronaphthalene. The formed piperidyl compound subsequently can easily be substituted at the nitrogen atom according to known procedures.

The term "inert organic solvent" is used above to indicate that said solvent does not react with any of the reactants, intermediates or the end product present in the system, and that it dissolves at least 2% of the organic starting material at room temperature. Among the useful solvents are methanol, ethanol, propanol, diethylene glycol monomethyl ether, and equivalents thereof.

To illustrate the preparation of the new compounds, reference is made to the following examples which are not intended to limit the invention in any respect.

Example 1.—6-methoxy-1-(4-piperidylmethyl)-1,2,3,4-tetrahydronaphthalene

A solution of 9.96 g. of 6-methoxy-1-(4-pyridylmethyl)-1,2,3,4-tetrahydronaphthalene in 300 ml. of ethanol is hydrogenated under 40 p.s.i.g. pressure at 60° C. in the presence of 3.0 g. of a 5% rhodium on alumina catalyst. Hydrogen uptake is completed in about 5 hrs. The solution is filtered and the catalyst is washed with ethanol. The wash-liquor is combined with the filtrate, and the solvent is removed under reduced pressure followed by the addition of 300 ml. of anhydrous ether and 25 ml. of ethanol containing 1.43 g. of hydrogen chloride. The formed 6-methoxy-1-(4-piperidylmethyl)-1,2,3,4-tetrahydronaphthalene hydrochloride is crystallized in a yield of 10.5 g. or 90.5% of theory. It has a melting point of 265–267° C. and its analytical values are in good agreement with those calculated for $C_{17}H_{26}ClNO$.

A sample of 8.37 g. of the above hydrochloride is taken up in water and made alkaline with 10% aqueous sodium hydroxide. The free amine is extracted with ether. The ether extract is washed with water and dried over anhydrous magnesium sulfate. Removal of the ether leaves 6.96 g. of a colorless oil which boils at 185–187° C. under 2 mm. Hg pressure. The analytical values are in good agreement with those calculated for $C_{17}H_{25}NO$.

When in the above reaction the starting material is replaced with 6-methoxy-1-(4-pyridylmethyl) - 3,4 - dihydronaphthalene, or 6-methoxy-1-(4-pyridylmethylidene)-1,2,3,4-tetrahydronaphthalene or a mixture thereof, the same result is obtained but a larger amount of hydrogen is used.

Example 2.—6-methoxy-1-(4-piperidyl-1-ethyl)-1,2,3,4-tetrahydronaphthalene

A solution of 4.12 g. of 6-methoxy-1-(4-pyridyl-1-ethyl)-1,2,3,4-tetrahydronaphthalene in 100 ml. of ethanol containing 1.5 ml. of concentrated hydrochloric acid is hydrogenated under 30 p.s.i.g. at 50–60° C. in the presence of 1.25 g. of 5% rhodium-on-carbon catalyst. After hydrogen absorption ceases, the catalyst is removed, and the solvent is evaporated from the filtrate, leaving 7.2 g. of a white solid. Crystallization of this solid from absolute ethanol/hexane leaves an almost theoretical yield of 6-methoxy-1-(4-piperidyl-1-ethyl)-1,2,3,4-tetrahydronaphthalene hydrochloride as a white solid melting at 237–244° C.

A 2.08 g. sample of the above hydrochloride is taken up in water and made alkaline with 5% aqueous sodium hydroxide. The mixture is extracted with ether and the ether extract is washed with water and dried over magnesium sulfate. Removal of the solvent leaves 1.50 g. of 6-methoxy-1-(4-piperidyl-1-ethyl)-1,2,3,4 - tetrhydronaphthalene as a colorless oil which has a boiling point of about 170° C. at 0.5 mm. Hg pressure. The analytical values are in close agreement with those calculated for $C_{18}H_{27}NO$.

Example 3.—6-methoxy-1-(N-formyl-4-piperidylmethyl)-1,2,3,4-tetrahydronaphthalene To a solution of 5.65 g. of 6-methoxy-1-(4-piperidylmethyl)-1,2,3,4-tetrahydronaphthalene in 32 ml. of 98% formic acid, cooled in an ice-bath is added 17.5 ml. of acetic anhydride over a period of 15 minutes. This solution is stirred for 30 minutes at 15° C. and 2 hrs. at room temperature, after which time ice-water is added and the mixture is stirred for 45 minutes at room temperature. The formed oil is extracted with ether and the ether extract is washed in series with 5% aqueous sodium bicarbonate and water and dried over anhydrous magnesium sulfate. Removal of the solvent under reduced pressure leaves 3.51 g. of a colorless oil which distills at 235–242° C.

under 3 mm. Hg to give 3.07 g. of 6-methoxy-1-(N-formyl-4-piperidylmethyl) - 1,2,3,4 - tetrahydronaphthalene. The analytical values are in close agreement with those calculated for $C_{18}H_{25}NO_2$, and a chloroform solution of the compound shows an infrared carbonyl absorption band at 1655 cm.$^{-1}$.

Example 4.—6-methoxy-1-(N-acetyl-4-piperidylmethyl)-1,2,3,4-tetrahydronaphthalene To a solution of 2.80 g. of 6-methoxy-1-(4-piperidylmethyl)-1,2,3,4-tetrahydronaphthalene in 95 ml. of dry ether is added 1.5 ml. of triethylamine followed by 0.76 ml. (0.84 g.) of acetyl chloride in 95 ml. of dry ether. This mixture is stirred for 45 minutes at room temperature and then diluted with ice-water. The product is extracted with ether and the ether extract is washed with water, dried over anhydrous magnesium sulfate and evaporated under reduced pressure to leave 3.16 g. of a colorless oil which distilles at 200–205° C. at 0.2 mm. Hg and is identified by infrared spectrum and chemical analysis as 6-methoxy-1-(N-acetyl-4-piperidylmethyl)-1,2,3,4-tetrahydronaphthalene of empirical formula $C_{19}H_{27}NO_2$.

Example 5.—6-methoxy-1-(N-propionyl-4-piperidylmethyl)-1,2,3,4-tetrahydronaphthalene In a repetition of Example 4, but using an equimolar amount of propionyl chloride in place of acetyl chloride 6-methoxy-1-(N-propionyl - 4 - piperidylmethyl)-1,2,3,4-tetrahydronaphthalene is obtained in a yield of 59%. After recrystallization from benzene/hexane, the pure compound shows a melting point of 74–77° C. and has an infrared absorption band in chloroform at 1620 cm.$^{-1}$. The analytical values are in close agreement with those for $C_{20}H_{29}NO_2$.

Example 6.—6-methoxy-1-(N-carboethoxy-4-piperidylmethyl)-1,2,3,4-tetrahydronaphthalene In a further repetition of Example 4 but replacing the acetyl chloride used there, with an equimolar amount of ethyl chloroformate, 6-methoxy - 1 - (N-carboethoxy-4-piperidylmethyl) - 1,2,3,4 - tetrahydronaphthalene is obtained in an 80% yield as a colorless oil boiling at 227° C. at 2.3 mm. Hg. The compound has an infrared carbonyl absorption band in chloroform at 1680 cm.$^{-1}$ and its analytical values are in agreement with $C_{20}H_{29}NO_3$.

Example 7.—6-methoxy-1-(N-methyl-4-piperidylmethyl)-1,2,3,4-tetrahydronaphthalene hydrochloride A 9 ml. commercial molar solution of borane in tetrahydrofurane is cooled in an ice-bath in a nitrogen atmosphere. Under stirring, 1.39 g. of 6-methoxy-1-(N-formyl-4 - piperidylmethyl)-1,2,3,4-tetrahydronaphthalene in 20 ml. of anhydrous tetrahydrofurane is dropwise added over a period of 5 minutes. This mixture containing a jelly-like material separating from the solution is refluxed for one hour and then cooled to room temperature. The mixture is diluted with 25 ml. of water, and 2 ml. of 1:1 hydrochloric acid is added. The tetrahydrofurane is removed by distillation and the residue is made alkaline with 5% aqueous sodium hydroxide. The alkaline mixture is extracted with ether and the ether extract is worked up in the usual way to leave 1.31 g. of a colorless oil which partially solidifies upon standing. Methanolic hydrochloric acid is added and the mixture is warmed on a steam-bath until solution is complete. This procedure decomposes any borine coordination compound that may be formed during the reaction. Removal of the solvent leaves 1.95 g. of a partially solid residue which is taken up in water and made alkaline with 5% aqueous sodium hydroxide. The mixture is extracted with ether and the extract is worked up in the usual manner to leave 1.10 g. of an oil. This oil is dissolved in ethanol and ethereal hydrochloric acid is added which produces 923 mg. (62% of theory) of white, crystalline 6-methoxy-1-(N-methyl-4-piperidylmethyl) - 1,2,3,4 - tetrahydronaphthalene hydrochloride melting at 211–213° C. The analytical values are in good agreement with those for $C_{18}H_{28}ClNO$.

Example 8.—6-methoxy-1-(N-ethyl-4-piperidylmethyl)-1,2,3,4-tetrahydronaphthalene hydrochloride In a repetition of Example 7, but using as the starting material 6-methoxy-1-(N-acetyl - 4 - piperidylmethyl)-1,2,3,4-tetrahydronaphthalene, white crystalline 6-methoxy-1-(N-ethyl-4-piperidylmethyl) - 1,2,3,4 - tetrahydronaphthalene hydrochloride is obtained in a 57% yield. The pure salt melts at 236–238° C. and its analytical values are in agreement with $C_{19}H_{30}ClNO$.

Example 9.—6-hydroxy-1-(4-piperidylmethyl)-1,2,3,4-tetrahydronaphthalene

A mixture of 1.00 g. of 6-methoxy-1-(4-piperidylmethyl)-1,2,3,4-tetrahydronaphthalene and 3.25 g. of pyridine hydrochloride is heated to 205–210° C. with stirring under nitrogen for one hour. The mixture is then cooled in an ice-bath, diluted with water and made alkaline with 5% aqueous sodium hydroxide. The mixture is extracted with ether and the alkaline aqueous layer is saturated with Dry Ice and also extracted with ether. The latter extract is washed with water and worked up in the usual manner to produce 0.3 g. of a white residue which after crystallization from ethanol/hexane gives 203 mg. of 6-hydroxy-1-(4-piperidylmethyl) - 1,2,3,4 - tetrahydronaphthalene as white crystals melting at 184–186° C. The analytical values are in agreement with $C_{16}H_{23}NO$.

The same compound is obtained by following the procedure of Example 1 but using 6-hydroxy-1-(4-pyridylmethyl-1,2,3,4-tetrahydronaphthalene as the starting material.

Example 10.—6-hydroxy-1-(N-acetyl-4-piperidylmethyl-1,2,3,4-tetrahydronaphthalene To a solution of 1.50 g. of the compound of Example 9 in 50 ml. of dry ether is added 1.7 ml. (1.24 g.) of triethylamine followed by 0.87 ml. (0.96 g.) of acetylchloride in 10 ml. of dry ether. The mixture is stirred for 50 minutes at room temperature, treated with ice-water and extracted with chloroform. The chloroform layer is extratced with Claisen's alkali. The aqueous extract is acidified with 1:1 hydrochloric acid and the solid so obtained is recrystallized from 95% ethanol giving 1.12 g. of 6-hydroxyl-1-(N - acetyl - 4 - piperidylmethyl) - 1,2,3,4 - tetrahydronaphthalene in the form of white crystals metling at 173–176° C. This phenolic amide has infrared absorption bands in chloroform at 3555, 3200 (broad) and 1600 cm.$^{-1}$. The analytical values are in agreement with $C_{18}H_{25}NO_2$.

It will be obvious to those skilled in the art that the reaction which takes places at the nitrogen atom of the piperidine ring (shown in Examples 3–10) can also be carried out with the compound shown in Example 2; for instance, 6 - methoxy - 1 - (N - propionyl - 4 - piperidyl - 1 - ethyl)-1,2,3,4-tetrahydronaphthalene can be made by following the procedure of Example 6, using 6-methoxyl-1(4-piperidyl-1-ethyl)-1,2,3,4-tetrahydronaphthalene as the starting material.

The starting materials used in the preparation of the above-described piperidylalkyl naphthalene derivatives are the corresponding pyridyl derivatives which are made by condensation of 6-methoxyl-1-tetralone with a pyridine of the formula

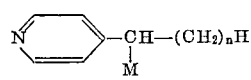

wherein $n$ is 0 or 1, and wherein M is an alkali metal, in the presence of an anhydrous, inert, organic solvent at a temperature between 0 to 100° C. under anhydrous conditions for a period of at least 15 minutes. This condensation product carries a double bond at the 1-position of the tetraline moiety which may be connecting to the 2-position or to the extra-cyclic carbon atom. Both of these possible products hydrogenate easily to the pyridylmethyltetralin in the presence of palladium; however, the double bond will also be saturated by the process of the present invention. In fact, this particular double bond hydrogenates prior to the pyridine ring so that it is immaterial for the process of the present invention whether the starting material contains this addtional double bond or not. In any event, the double bonds in the hydroxy- or methoxy-substituted ring of the naphthalene moiety will not be effected by the hydrogenation reaction under the conditions specified herein.

The hydrogenation of the present process can be carried out in the presence of any rhodium catalyst but preferably said rhodium is supported by one of the conventional carriers such as alumina, carbon, silica gel, bentonite, kieselguhr, and the like. The amount of metallic rhodium needed is very small; good results are obtained by using between 0.1 and 2% of the metal based on the amount of the organic starting material. This amount of rhodium may be present in supported form on a carrier containing between 2.5 and 10% of the metal. Of course, pressures higher than the above 100 p.s.i.g. may be used, but no advantage is gained thereby. Pressures below this limit are actually preferred since they permit the use of so-called low-pressure equipment such as a Parr shaker or a still.

The new compounds are useful as free bases or when R″ is hydrogen or loweralkyl, may be used in form of their acid addition salts. Among these sales are the hydrochloride, sulfate and phosphate salts which may be used for the intended biological use. However, other salts are also of merits as intermediates in the preparation of the above-named pharmaceutically acceptable salts or the free bases.

Others may practice the invention in any of the numerous ways which will be suggested to one skilled in the art by the present disclosure. All such practice of the invention is considered to be a part hereof provided it falls within the scope of the appended claims.

I claim:
1. A compound of the formula

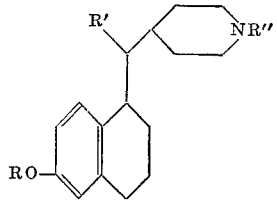

wherein R and R′ each is hydrogen or methyl and R″ is hydrogen, loweralkyl, formyl, lower fatty acid acyl, or carboloweralkoxy, and acid addition salts of the compounds wherein R″ is hydrogen or loweralkyl.

2. The compound of claim 1 wherein R is hydrogen or methyl R′ is hydrogen and wherein R″ is acetyl.

3. The compound of claim 1 wherein R, R′ and R″ all are hydrogen, and acid addition salts thereof.

4. The compound of claim 3 wherein said acid addition salt is a physiologically acceptable salt.

References Cited

Freifelder et al.: "J. Org. Chem.," vol. 27, pp. 284–6, (1962).

HENRY R. JILES, *Primary Examiner.*

R. T. BOND, *Assistant Examiner.*

U.S. Cl. X.R.
260—290, 293.2, 294.3, 294.7, 297; 242—263, 267